US000001469H

United States Statutory Invention Registration [19]

[11] Reg. Number: H1469

Simonoff

[43] Published: Aug. 1, 1995

[54] REMOTELY PILOTED VEHICLE CONTROL AND INTERFACE SYSTEM

[75] Inventor: Adam J. Simonoff, Springfield, Va.

[73] Assignee: The United States of America as represented by the Secretary of the Navy, Washington, D.C.

[21] Appl. No.: 940,159

[22] Filed: Sep. 3, 1992

[51] Int. Cl.[6] ..... H04Q 9/00

[52] U.S. Cl. ..... 341/176; 180/167; 318/16; 446/454; 446/456; 340/825.69; 340/825.72

[58] Field of Search ..... 341/176, 175, 191; 340/825.69, 825.72; 180/65, 167; 446/454, 456; 318/16

[56] References Cited

U.S. PATENT DOCUMENTS 4,929,949 5/1990 Yamamoto et al. ..... 341/176

FOREIGN PATENT DOCUMENTS 60-245003 12/1985 Japan ..... 318/16

*Primary Examiner*—Bernarr E. Gregory
*Attorney, Agent, or Firm*—James B. Bechtel

[57] ABSTRACT

A remotely piloted vehicle control and interface system is provided. A personal computer equipped with an RS232 serial communication port passes an ASCII character(s) as a serial data stream. A shift register device converts the serial data stream to a parallel data character and continuously generates a status signal indicating one of the presence or absence of the parallel data character. A central processing unit, responsive to the status signal, compares the parallel data character with a set of valid control characters to generate a control signal when a match occurs therebetween. A transmitter, responsive to the control signal, transmits a radio frequency control signal to the remotely piloted vehicle.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOTELY PILOTED VEHICLE CONTROL AND INTERFACE SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to remotely piloted vehicle control systems, and more particularly to a remotely piloted vehicle control and interface system to allow operator control of the vehicle from a computer.

BACKGROUND OF THE INVENTION

The term "remotely piloted vehicles" (RPV) covers radio controlled or fly-by-wire vehicles ranging from simple toy cars and airplanes to complex remotely controlled aircraft drones used in experimental or military applications. Typically, operator control of these vehicles is in the form of joystick movement. The joystick movements are transmitted as vehicle commands via radio frequency waves to a receiver mounted on the vehicle. The vehicle commands are interpreted onboard the vehicle and used to control the movement of the vehicle. Unfortunately, precise control of RPV movements is difficult to achieve with a joystick. However, precise control is particularly important when the RPV is operating within precise windows of scaled speed and/or height restrictions.

SUMMARY OF THE INVENTION

Accordingly, it is an object of the present invention to provide a system of control for movable bodies such as a remotely piloted vehicle that overcomes the drawbacks associated with joystick style control.

Another object of the present invention is to provide a system of control for a remotely piloted vehicle that utilizes the vehicle's existing receiver and control mechanisms.

Yet another object of the present invention is to provide a system of control for a remotely piloted vehicle that is easily adapted to a variety of remotely piloted vehicle types.

Other objects and advantages of the present invention will become more obvious hereinafter in the specification and drawings.

In accordance with the present invention, a remotely piloted vehicle control and interface system is provided. A computer (e.g., personal computer) has a serial communication port for passing a character(s) thereover. The computer generates a serial data stream at the serial communication port indicative of the ASCII character. A shift register device converts the serial data stream to a parallel data character and continuously generates a status signal indicating presence or absence of the parallel data character. A central processing unit, responsive to the status signal, compares the parallel data character with a set of valid control characters. A control signal is generated when the parallel data character matches one character from the set of valid control characters. A transmitter, responsive to the control signal, transmits a radio frequency control signal to the remotely piloted vehicle.

DETAILED DESCRIPTION OF THE INVENTION

Figure 1:
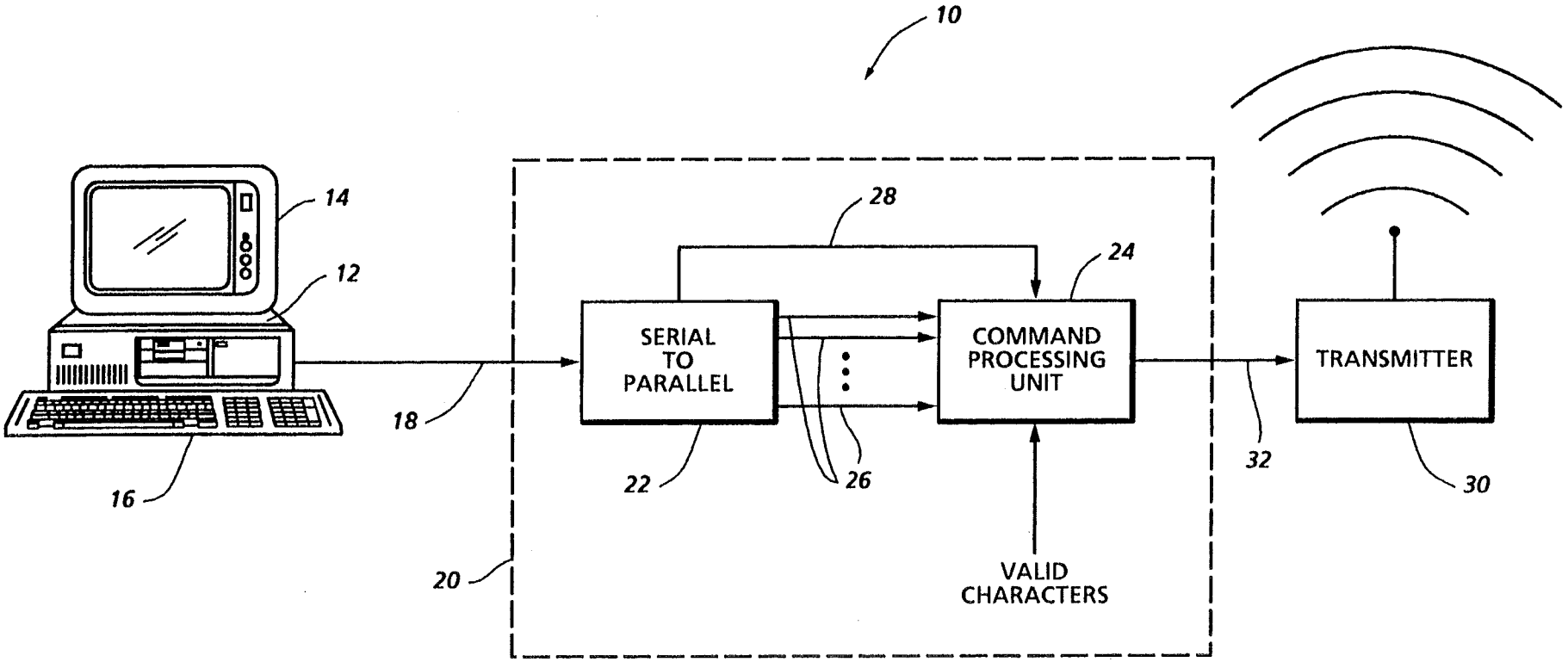
FIG. 1 is a block diagram showing the basic elements of the remotely piloted vehicle control and interface system according to an embodiment of the present invention.

Referring now to the drawings, and more particularly to FIG. 1, the basic elements of a remotely piloted vehicle control and interface system 10 are shown in block diagram form. A personal computer 12, having a video monitor 14 and keyboard 16, is provided to convert vehicle control commands entered on keyboard 16 into ASCII representations thereof. Each character entered on keyboard 16 (or sequence of characters preprogrammed and provided by computer 12) may be displayed on video monitor 14 (or echoed back to the character sequence sending program) for purposes of verification. As is the case with most personal computers, an RS232 serial communication port (not shown) is provided to transfer serial data from computer 12 to other devices. Accordingly, a cable 18 carries the ASCII vehicle control commands from the RS232 serial communication port to an interface 20 utilized by the present invention.

The basic elements of interface 20 include a serial-to-parallel converter 22 and a command processing unit 24. Converter 22 receives the vehicle control commands in the form of a serial data stream on cable 18 and converts same into a parallel format for each ASCII data character received. Each ASCII data character in parallel format is made available on parallel output lines 26. The presence of a data character on output lines 26 causes a STATUS bit to be set in serial-to-parallel converter 22. The contents of the STATUS bit are made available on a status line 28 to command processing unit 24. Status line 28, or the STATUS bit of serial-to-parallel converter 22, may be polled by command processing unit 24 or may serve as an interrupt to command processing unit 24. In either case, command processing unit 24 processes the data character passed on parallel output lines 26.

Processing of the parallel data character by command processing unit 24 includes comparing each parallel data character with a given set of valid characters. For example, if the keyboard characters A, W, S and Z represented the vehicle commands "left", "forward", "right", and "backward", respectively, the ASCII representations of these characters would be compared with the parallel data character. A match between the parallel data character and the set of valid characters results in the associated control (e.g., "left", "forward" etc.) being issued to a radio frequency transmitter 30 over a control line 32. Transmitter 30 may be the transmitter used in the joystick/transmitter of a remotely piloted vehicle (not shown). Accordingly, no modifications to the remotely piloted vehicle are required. Furthermore, the remotely piloted vehicle can now receive precise commands directly from the command processing unit 24 as each keystroke of a valid keyboard character (or each character provided by a pre-programmed sequence from computer 12) can translate to a specific (digital) amount of directional and/or speed control.

Figure 2:
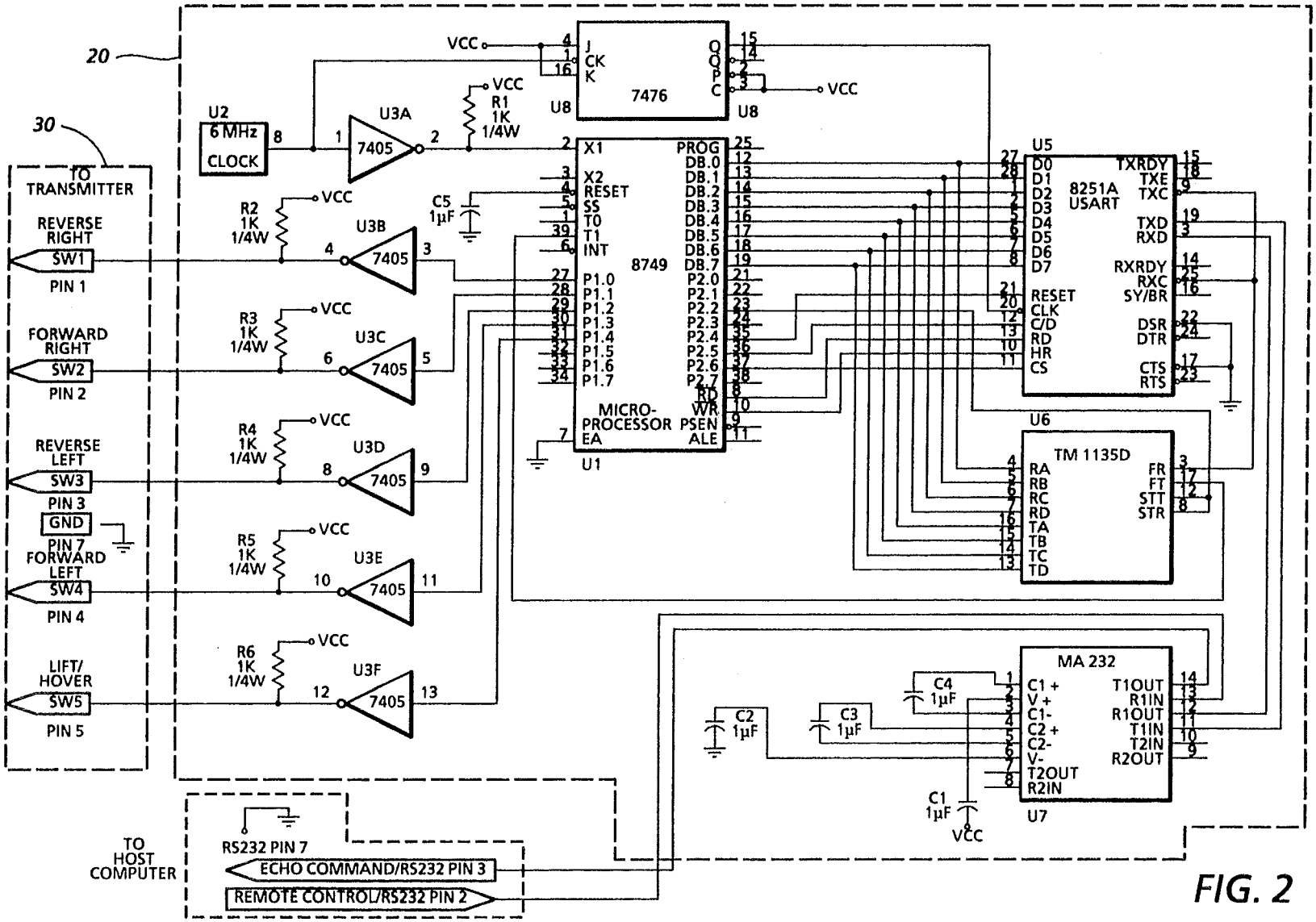
FIG. 2 is a schematic drawing representative of an interface configured for a radio control hovercraft in accordance with the present invention.

By way of example, the detailed schematic of FIG. 2 shows interface 20 as it has been configured for a radio control model hovercraft that can maneuver forwards or backwards in a straight line, rotate left or right, and generate lift in accordance with commands sent from a radio transmitter. The RS232 port (not shown) of computer 12 is connected to interface 20 via cable 18 as described above. The 12 volt line level RS232 command voltages are converted to transistor-transistor logic (TTL) levels that are utilized by the remainder of the devices of interface 20. For the instant example, the RS232 command voltages on pin 2 of the RS232 port are input to a TTL converter U7 to be converted to 5 volt TTL levels. In the preferred embodiment of this example, converter U7 is a MAX232 available from Maxim Integrated Products, Inc., 510 North Pastora Ave., Sunnyvale, Calif. 94086.

The 5 volt TTL serial data (indicative of the command voltage issued by computer 12) is passed to pin 3 of a shift register U5. In the preferred embodiment, shift register U5 is a universal synchronous/asynchronous receiver/transmitter (USART). One such USART is the 8251A USART available from Intel Corporation, Dept. G., 3065 Bowers Ave., Santa Clara, Calif. 95051. As configured, USART U5 is programmed to operate at 9600 baud, 8 data bits, 1 start, 1 stop with no parity. A baud rate clock U6 is connected as shown to clock serial data through USART U5 to control the baud rate of USART U5. In the preferred embodiment of this example, baud rate clock U6 is a TM1135D available from Oscillatek, 620 N. Lindenwood Drive, Olathe, Kans. 66062.

At the heart of interface 20 is a microprocessor U1 functioning as the command processing unit 24. In the preferred embodiment of this example, microprocessor U1 is an 8749 microcontroller available from Intel Corporation. Microprocessor U1, as configured, has a power requirement of +5 VDC at 1 Amp. However, it is to be understood that the choice of microprocessor is arbitrary. Accordingly, software written to control the microprocessor would be written in the microprocessor's native language.

Microprocessor U1 asserts the control lines of USART U5 to transfer data, status and commands with USART U5. Microprocessor U1 is wired to USART U5 as shown so that typical address decoder logic schemes are not necessary. In particular, communication links within interface 20 are initialized by writing to microprocessor U1, Port 2 (pins 21–24, 35–38). In this way, the RESET input (pin 21) of USART U5 is toggled and microprocessor U1 programs baud rate clock U6 for 9600 baud and USART U5 to use 1 start bit, 8 data bits, 1 stop bit, and no parity as the communication parameters. The USART program data is placed on the data bus (pins 12–19) of microprocessor U1, and a WRITE signal on microprocessor U1 (pin 10) is asserted simultaneously with the COMMAND ("C/D") signal on USART U5 (pin 12) and the SELECT ("CS") signal on USART U5 (pin 11). Thus, microprocessor U1 asserts the control lines of USART U5 and its baud rate clock U6 without it being necessary to decode physical address spaces.

Microprocessor U1 is driven by a 6 MHz clock oscillator U2 available from CTS Corporation, Knight Division, 400 East Reimann Ave., Sandwich, Ill. 60548. The clock signal from clock oscillator U2 is further divided by two to improve clock frequency accuracy (as is known in the art) and is supplied to 25 the clock input (pin 20) of USART U5. This is accomplished by configuring a model 7476 flip-flop U8 as shown. Flip-flop U8 is available from National Semiconductor, 2900 Semiconductor Drive, Santa Clara, Calif. 95051.

Microprocessor U1 receives a parallel format data character from USART U5 to i) evaluate its validity as a vehicle control command and ii) (assuming a valid vehicle control command is present) provide the signal to be asserted to transmitter 30. As mentioned briefly above, the presence of a data character causes a STATUS bit to be set in USART U5. The STATUS bit is also available on USART U5 as "RXRDY" (pin 14). The STATUS indicates to microprocessor U1 that a character has been received in the USART's memory buffer. USART U5 can provide RXRDY to microprocessor U1 in either of two ways: 1) as a discrete signal line from USART U5 to an input on microprocessor U1 such as an interrupt line, or 2) as a bit set in the status register of USART U5 when addressed for a read in the USART's command mode (as employed by the preferred embodiment of the instant invention).

When microprocessor U1 determines that a vehicle control command is to be sent to transmitter 30, the vehicle control command (in the form of a parallel data character) is passed from USART U5 on the data bus of microprocessor U1. As will be explained in greater detail hereinbelow, the parallel data character is compared with a set of valid characters. Assuming that a match is found, microprocessor U1 asserts a particular bit pattern on its Port 1 (pins 27–34) associated with the matched valid character. The asserted bit pattern sets switches SW1–SW5 of transmitter 30 to coincide with the particular (valid) vehicle control command. Transmitter 30 then transmits a radio frequency signal indicative of the bit pattern issued by microprocessor U1. Note that for the instant example, transmitter 30 treats an active low as an asserted signal. Accordingly, the bit pattern issued by microprocessor U1 is fed through an open collector hex inverter U3. In the preferred embodiment of this example, inverter U3 is a model 7405 available from National Semiconductor. Pull-up resistors R2–R6 are provided to guarantee that nonasserted lines remain high. Bit patterns associated with the various hovercraft maneuvers are as follows:

| | Microprocessor U1 | | | | |
|---|---|---|---|---|---|
| Direction | Pin 31 | Pin 30 | Pin 29 | Pin 28 | Pin 27 |
| Forward | 1 | 1 | 0 | 1 | 0 |
| Backward | 1 | 0 | 1 | 0 | 1 |
| Rotate Left | 1 | 0 | 1 | 1 | 0 |
| Rotate Right | 1 | 1 | 0 | 0 | 1 |

For the radio controlled hovercraft, the lift/hover fan is activated automatically when a vehicle control command is recognized.

Figure 3:
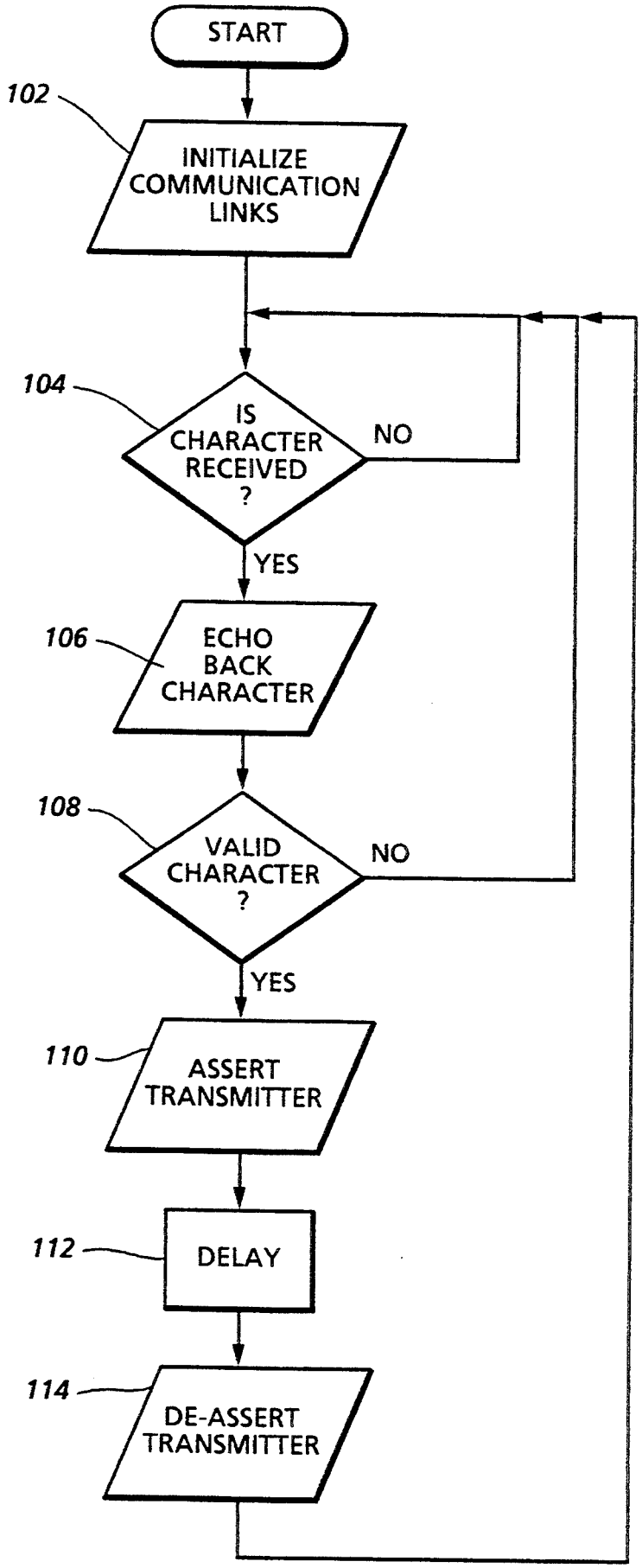
FIG. 3 is a software flowchart of the program running in the control processing unit of the system interface shown in FIG. 2.

FIG. 3 is a flow-chart for the interface software. In the preferred embodiment of the above-described example, the software was written in MCS-48 assembly language to complement the 8749 microprocessor chosen and illustrated in FIG. 2. It is considered within the capabilities of one of ordinary skill in the art to develop the appropriate software from the flowchart of FIG. 3 described hereinbelow.

After the main program is started, communication links within the interface are initialized at block 102. This includes turning off all switches in the transmitter, resetting the USART and initializing the baud rate clock. At block 104, microprocessor U1 checks (or may be interrupted by) the USART status to see if a character has been received by the USART. Once a character is received from the keyboard or from a pre-programmed sequence of characters, the character is echoed back at block 106 and may be displayed on the computer monitor for user verification. Valid vehicle control commands are defined in terms of the ASCII representations thereof. For example, the keyboard characters A, W, S, and Z could be used to represent the vehicle control commands "rotate left", "straight forward", "rotate right", and "straight backward", respectively. Note that the choice of keyboard characters is not a limitation of the present invention. Thus, an additional or a replacement set of keyboard characters could also be used.

In the microprocessor, the character received from the USART is compared with the set of valid vehicle command controls defined by their ASCII representations at block 108. If the character is not valid, the program loops back to block 104 to await a new character. If the character is valid, the microprocessor issues the bit pattern (associated with the character) to turn on the transmitter at block 110 and then the program introduces a slight delay at block 112 to allow the vehicle control command to be executed. While the length of delay may vary, this delay is typically on the order of one second. This allows the microprocessor to mimic the fastest manual toggle that may occur at a hand-held joystick/transmitter. This prevents damage to the remotely piloted vehicle motors while sending a signal that lasts long enough for recognition by the transmitter circuit. After the delay, the transmitter switches are turned off at block 114 and the program awaits a new character at block 104.

The advantages of the control and interface system of the present invention are numerous. A remotely piloted vehicle can be controlled in a precise, digital fashion in order to more accurately operate the vehicle within certain scaled speeds and/or directions. In addition, any computer equipped with a standard serial RS232 communications port can be used to operate an RPV. The present invention enables an RPV to operate autonomously as a robot under computer control. The present invention also provides a means for an RPV to operate with external feedback under computer control.

Although the invention has been described relative to a specific embodiment thereof, there are numerous variations and modifications that will be readily apparent to those skilled in the art in the light of the above teachings. For example, keyboard entered controls could be replaced with a string of precise vehicle control commands thereby enabling the vehicle to travel on a predetermined course under remote computer control. In addition, the computer-to-interface connection could easily be modified to communicate with a host computer using a parallel interface or a custom wiring schema tailored for a specific computer design. Further, RPV control might be generated by a network of computers. It is therefore to be understood that, within the scope of the appended claims, the invention may be practiced other than as specifically described.

What is claimed as new and desired to be secured by Letters Patent of the United States is:

1. A remotely piloted vehicle control and interface system, comprising:

a computer having a keyboard and a serial communication port, wherein the keyboard receives a user entered command and generates a character in response thereto, and wherein said computer generates a serial data stream at said serial communication port indicative of the keyboard generated character;

means for converting the serial data stream to a parallel data character;

data processing means comparing the parallel data character with a set of valid control characters for generating a control signal when the parallel data character matches one character from the set of valid control characters; and transmitter means responsive to the control signal for transmitting a radio frequency control signal to the remotely piloted vehicle.

2. A system as in claim 1 further comprising means for converting the serial data stream to transistor-transistor logic (TTL) levels interpretable by said data processing means.

3. A system as in claim 1 further comprising means for conditioning the control signal generated by said central processing unit to a transistor-transistor logic (TTL) level interpretable by said transmitter,

4. A system as in claim 1 further comprising means for displaying the keyboard generated character to the user.

5. A system as in claim 1 wherein said means for converting comprises:

a shift register; and means for clocking the serial data through said shift register.

6. A remotely piloted vehicle control and interface system, comprising:

a computer having a serial communication port to pass a character thereover, wherein said computer generates a serial data stream at said serial communication port indicative of the character;

shift register means for converting the serial data stream to a parallel data character, said shift register means continuously generating a status signal indicating one of the presence or absence of the parallel data character;

data processing means, responsive to the status signal indicating the presence of the parallel data character for comparing the parallel data character with a set of valid control characters and for generating a control signal when the parallel data character matches one character from the set of valid control characters; and transmitter means responsive to the control signal for transmitting a radio frequency control signal to the remotely piloted vehicle.

7. A system as in claim 6 wherein said data processing means polls said shift register means for the status signal indicating the presence of the parallel data character.

8. A system as in claim 6 wherein said data processing means is interrupt driven by the status signal indicating the presence of the parallel data character.

9. A system as in claim 6 wherein said shift register means comprises:

a universal synchronous/asynchronous receiver/-transmitter; and means for clocking the serial data through said universal synchronous/asynchronous receiver/transmitter,

10. A system as in claim 6 further comprising means for converting the serial data stream to transistor-transistor logic (TTL) levels interpretable by said central processing unit.

11. A system as in claim 6 further comprising means for conditioning the control signal generated by said central processing unit to a transistor-transistor logic (TTL) level interpretable by said transmitter.

12. In a remote control system having a transmitter through which command signals are radiated to a movable body in response to generation of serial data by a keyboard operated computer; interface means for operatively connecting the computer to the transmitter, including: converter means coupled to the keyboard operated computer for conversion of the serial data to a parallel format while continuously generating data status signals for processing the command processor means rendered operative by said data status signals for processing the converted serial data in said parallel format into the command signals supplied to the transmitter, and means conducting the converted serial data along plural paths to the command processor means for said processing by comparison with valid control characters.

* * * * *